(12) United States Patent
Bito et al.

(10) Patent No.: US 7,858,232 B2
(45) Date of Patent: *Dec. 28, 2010

(54) NON-AQUEOUS ELECTROLYTE SECONDARY BATTERY

(75) Inventors: Yasuhiko Bito, Sakai (JP); Toshitada Sato, Osaka (JP); Teruaki Yamamoto, Osaka (JP); Tomohiro Ueda, Kashiba (JP)

(73) Assignee: Panasonic Corporation, Osaka (JP)

( * ) Notice: Subject to any disclaimer, the term of this patent is extended or adjusted under 35 U.S.C. 154(b) by 1144 days.

This patent is subject to a terminal disclaimer.

(21) Appl. No.: 11/269,743

(22) Filed: Nov. 9, 2005

(65) Prior Publication Data

US 2006/0102473 A1 May 18, 2006

Related U.S. Application Data

(63) Continuation-in-part of application No. 11/174,664, filed on Jul. 6, 2005.

(30) Foreign Application Priority Data

Nov. 15, 2004 (JP) ............................. 2004-330607

(51) Int. Cl.
*H01M 4/58* (2010.01)
(52) U.S. Cl. ............................. 429/218.1; 429/231.95; 429/231.5; 429/223; 429/220; 429/221
(58) Field of Classification Search .............. 429/218.1, 429/231.95, 231.5, 223, 220, 221
See application file for complete search history.

(56) References Cited

U.S. PATENT DOCUMENTS

| | | | |
|---|---|---|---|
| 4,517,265 A | 5/1985 | Belanger et al. | |
| 4,957,833 A | 9/1990 | Daifuku et al. | |
| 5,340,670 A | 8/1994 | Takami et al. | |
| 5,556,721 A | 9/1996 | Sasaki et al. | |
| 6,051,340 A | 4/2000 | Kawakami et al. | |
| 6,090,505 A | 7/2000 | Shimamura et al. | |
| 6,432,585 B1 | 8/2002 | Kawakami et al. | |
| 6,569,568 B2 | 5/2003 | Kobayashi et al. | |
| 6,730,434 B1 | 5/2004 | Kawakami et al. | |
| 6,835,496 B1 | 12/2004 | Kaminaka et al. | |
| 7,537,862 B2 * | 5/2009 | Sato et al. ................ | 429/218.1 |
| 2003/0096168 A1 | 5/2003 | Kasamatsu et al. | |
| 2004/0062990 A1 * | 4/2004 | Shimamura et al. ...... | 429/218.1 |

FOREIGN PATENT DOCUMENTS

| | | |
|---|---|---|
| CN | 1274179 A | 11/2000 |
| CN | 1131570 C | 12/2003 |
| EP | 1 274 140 | 1/2003 |
| EP | 1 396 894 | 3/2004 |
| JP | 63-013267 | 1/1988 |
| JP | 04-332472 | 11/1992 |
| JP | 08-096794 | 4/1996 |
| JP | 10-223221 | 8/1998 |
| JP | 10-294112 | 11/1998 |
| JP | 2000-173609 | 6/2000 |
| JP | 2000-173610 | 6/2000 |
| JP | 2001-291512 | 10/2001 |
| JP | 2001-307723 | 11/2001 |
| JP | 2004-103340 A | 4/2004 |
| JP | 2004-220926 | 8/2004 |
| JP | 2004-335272 | 11/2004 |
| WO | WO 2005008809 * | 1/2005 |

OTHER PUBLICATIONS

Korean Office Action, issued in Corresponding Korean Patent Application No. 10-2005-0108592, dated on Dec. 3, 2007.
Chinese Office Action issued in Chinese Patent Application No. 2005101201850 dated on Feb. 15, 2008.
United States Office Action issued in U.S. Appl. No. 11/174,664 dated Jun. 23, 2010.

* cited by examiner

*Primary Examiner*—Laura S Weiner
(74) *Attorney, Agent, or Firm*—McDermott Will & Emery LLP

(57) ABSTRACT

A non-aqueous electrolyte secondary battery that has a high electrical capacity and exhibits excellent cycle characteristics even when the battery is rapidly charged and discharged at a large current includes: a positive electrode capable of reversibly absorbing and desorbing Li; a negative electrode; and a non-aqueous electrolyte. The negative electrode includes an alloying material that is capable of electrochemically absorbing and desorbing Li, and includes an A phase composed mainly of Si and a B phase including an intermetallic compound of at least one transition metal element and Si. The transition metal element is selected from the group consisting of Ti, Zr, Ni, Cu, and Fe. At least one of the A phase and the B phase includes a microcrystalline or amorphous region. The weight percent of the A phase relative to the total weight of the A phase and the B phase is greater than 40% and not greater than 95%.

15 Claims, 1 Drawing Sheet

F I G. 1
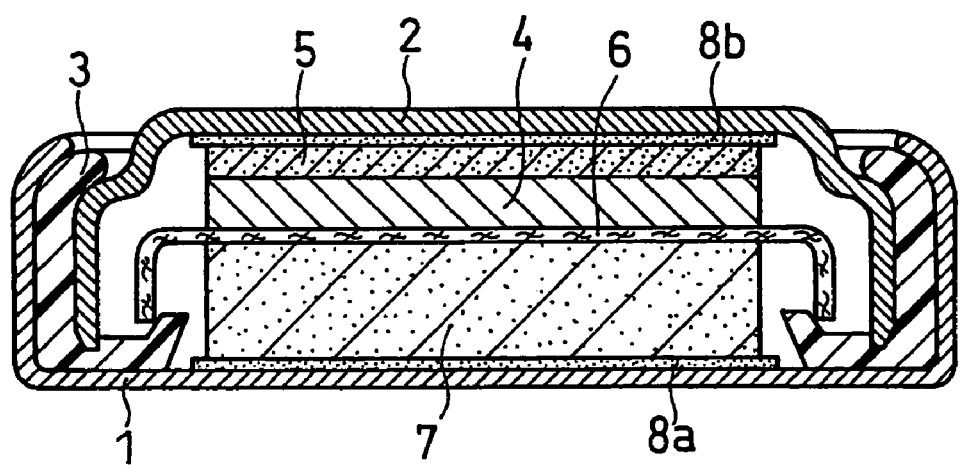

NON-AQUEOUS ELECTROLYTE SECONDARY BATTERY

This application is a continuation-in-part of U.S. patent application Ser. No. 11/174,664, filed Jul. 6, 2005, which in turn claims the benefit of Japanese Application No. 2004-330607, filed Nov. 15, 2004, the disclosures of which Applications are incorporated by reference herein in their entirety.

FIELD OF THE INVENTION

The present invention relates to an improvement in the negative electrode of a non-aqueous electrolyte secondary battery. The present invention provides a non-aqueous electrolyte secondary battery having a high electrical capacity and excellent charge and discharge (hereinafter referred to as "charge/discharge") cycle characteristics.

BACKGROUND OF THE INVENTION

Non-aqueous electrolyte secondary batteries can realize high voltage and high energy density, so they have been researched extensively. Positive electrodes of non-aqueous electrolyte secondary batteries include a transition metal oxide or a transition metal chalcogenide, such as $LiMn_2O_4$, $LiCoO_2$, $LiNiO_2$, $V_2O_5$, $Cr_2O_5$, $MnO_2$, $TiS_2$, or $MoS_2$. Such material has a layered or tunnel-like crystal structure into and from which lithium ions are intercalated and deintercalated. The negative electrodes typically include a carbon material. Although a carbon material typically has a relatively small capacity, it is capable of reversibly absorbing and desorbing lithium, thereby providing a battery that is excellent in terms of cycle life and safety. Thus, lithium ion batteries including a negative electrode using a graphite type carbon material have been commercialized.

However, the theoretical capacity of a graphite material is 372 mAh/g, and the theoretical density thereof is 2.2 $g/cm^3$, both of which are relatively small. It is therefore desired that a metal material capable of realizing a higher capacity than that of a graphite material will be used for a negative electrode. Among metal materials, Si particularly has a high capacity of 4199 mAh/g (theoretical density: 2.33 $g/cm^3$), and hence an extensive research and development studies have been underway.

Although Si is capable of realizing a high capacity negative electrode, it has a significant problem to be solved with respect to the charge/discharge cycle characteristics of the resultant battery. The problem is that during charge and discharge reactions, the absorption and desorption of lithium involves repeated expansion and contraction of Si, thereby increasing the contact resistance among particles in the negative electrode and degrading the current collecting network. Such degraded current collecting network becomes a major factor that causes shortening of charge/discharge cycle life.

In order to solve the above-mentioned problems, there has been proposed as a negative electrode material an alloy forming material (hereinafter referred to as "alloying material") that is capable of reversibly absorbing and desorbing lithium and includes a solid phase A and a solid phase B. The solid phase A and the solid phase B have a different composition, and at least part of the solid phase A is coated with the solid phase B. The solid phase A contains silicon, tin, and/or zinc, while the solid phase B contains a Group 2A element, a transition element, a Group 2B element, a Group 3B element, and/or a Group 4B element. Also, according to this proposal, the solid phase A is preferably amorphous or of low crystallinity. See, for example, U.S. Pat. No. 6,090,505 and Japanese Laid-Open Patent Publication No. 2004-103340.

Also, in terms of improving cycle life, Japanese Laid-Open Patent Publication No. 2004-335272 proposes a negative electrode active material comprising an A phase composed mainly of Si and a B phase comprising a compound of a transition metal and Si, where at least one of the A phase and the B phase is amorphous or low crystalline.

The related art techniques mentioned above are capable of significantly suppressing the cracking of the alloying material upon expansion and contraction thereof. Therefore, these techniques are effective to a certain extent in suppressing the degradation of the current collecting network, which is a major factor causing the degradation of cycle characteristics. However, a detailed examination of these related art techniques has revealed that the techniques may not produce sufficient suppression of cycle characteristic deterioration when batteries are rapidly charged and discharged at a relatively large current.

Reducing the particle size of a negative electrode active material has also been examined. For example, a Si powder with a mean particle size of 1 to 100 μm (Japanese Laid-Open Patent Publication No. 2003-109590), 0.1 to 2.5 μm (Japanese Laid-Open Patent Publication No. 2004-185810), 1 nm to 200 nm (Japanese Laid-Open Patent Publication No. 2004-214055), or 0.01 to 50 μm (Japanese Laid-Open Patent Publication No. 2000-36323) has been proposed. The use of a negative electrode active material in the form of a fine powder allows alloying of lithium and Si to proceed evenly upon charge, thereby suppressing localization of the reaction. It is therefore possible to reduce volume expansion due to alloying upon charge and volume contraction upon discharge, so that the negative electrode is unlikely to get distorted. As a result, it is considered that charge/discharge cycling can be repeated in a stable manner.

However, a conventional negative electrode is produced using a negative electrode mixture. For example, the negative electrode of a coin-shaped battery is a pellet that is obtained by molding a negative electrode mixture into a disc-shaped pellet under pressure. The negative electrode mixture contains a negative electrode active material that causes an electrochemical reaction, a conductive agent that supplements the electron conductivity inside the negative electrode, and a binder that makes these materials stick together. If the mean particle size of the active material is small, the density of the negative electrode obtained by molding the negative electrode mixture becomes small. Thus, the energy density per unit volume becomes low and the battery capacity also becomes small.

Also, if the mean particle size of the active material is small, the irreversible capacity of the battery increases, so that the battery capacity is further lowered. Further, the small particle size of the active material increases the reactivity of the active material with moisture and other components in the electrolyte, thereby promoting gas evolution. Accordingly, this is disadvantageous to the cycle characteristics and storage characteristics.

On the other hand, in order to obtain a negative electrode with a higher density or suppress gas evolution, if the mean particle size of the active material is increased, the distribution of the active material becomes uneven inside the negative electrode. Hence, intercalation and deintercalation of lithium upon charge and discharge become uneven inside the electrode, which is disadvantageous to the cycle life of the battery.

That is, the proposals of U.S. Pat. No. 6,090,505 and Japanese Laid-Open Patent Publication No. 2004-103340 and No. 2004-335272 have a problem with respect to a rapid charge/ discharge at a large current. The proposals of Japanese Laid-Open Patent Publication No. 2003-109590, No. 2004-185810, No. 2004-214055, and No. 2000-36323 have a problem with regard to the balance between capacity and cycle characteristics. Particularly when the negative electrode is produced by molding a negative electrode mixture into a pellet, it is difficult to obtain a non-aqueous electrolyte secondary battery with a high capacity and excellent cycle characteristics.

BRIEF SUMMARY OF THE INVENTION

In order to sufficiently suppress cycle characteristic deterioration even in cases of charge/discharge at a relatively large current, the present inventors have diligently researched optimization of the state of the A phase and the B phase. As a result, they have found that with respect to an alloying material including an A phase composed mainly of Si and a B phase comprising an intermetallic compound of a transition metal element and Si, it is particularly effective to optimize the ratio between the A phase and the B phase and their compositions, as well as the size of crystallites (crystal grains). The present invention is based on these findings.

The present invention relates to a non-aqueous electrolyte secondary battery including: a positive electrode capable of reversibly absorbing and desorbing Li; a negative electrode; and a non-aqueous electrolyte. The negative electrode includes an alloying material (alloy forming material) that is capable of electrochemically absorbing and desorbing Li, and the alloying material includes an A phase composed mainly of Si and a B phase comprising an intermetallic compound of a transition metal element and Si. The transition metal element is at least one selected from the group consisting of Ti, Zr, Ni, Cu, and Fe. At least one of the A phase and the B phase includes a microcrystalline or amorphous region. The weight percent of the A phase (relative to the total weight of the A phase and the B phase) is greater than 40% and not greater than 95%.

In the microcrystalline or amorphous region constituting the A phase and/or the B phase, the crystallite size is preferably not more than 100 nm, and more preferably not less than 5 nm and not more than 100 nm.

Also, when an X-ray diffraction analysis of the alloying material is performed with CuKα rays as a radiation source, the resultant diffraction spectrum is preferably such that the most intense diffraction peak in the range of diffraction angle 2θ=10° to 80° or 2θ=20° to 35° has a half width of 0.1° or more.

When the transition metal element is Ti, the Si content in the alloying material is desirably 72.4 to 97.7% by weight.

When the transition metal element is Zr, the Si content in the alloying material is desirably 62.8 to 96.9% by weight.

When the transition metal element is Ni, the Si content in the alloying material is desirably 69.4 to 97.45% by weight.

When the transition metal element is Cu, the Si content in the alloying material is desirably 68.2 to 97.35% by weight.

When the transition metal element is Fe, the Si content in the alloying material is desirably 70 to 97.5% by weight.

When the Si content in the alloying material is in the above-mentioned range, the content of the A phase in the alloying material is in the range of 40 to 95% by weight.

When the transition metal element is Ti, the B phase desirably contains $TiSi_2$.

The alloying material preferably has a volume cumulative frequency as a function of particle size distribution in which the mean particle size (median diameter: D50) is 0.5 to 20 µm, the 10% diameter (D10) is 0.1 to 5 µm, and the 90% diameter (D90) is 5 to 80 µm.

The present invention particularly relates to a coin-shaped non-aqueous electrolyte secondary battery having a coin-shaped battery case including a positive electrode can and a negative electrode can. The positive electrode and the negative electrode are in disc form and are placed in the positive electrode can and the negative electrode can, respectively. A separator is interposed between the positive electrode and the negative electrode, and the opening edge of the positive electrode can is fitted to the opening edge of the negative electrode can with an insulating gasket interposed therebetween.

The negative electrode preferably has a density of 1.6 to 2.4 $g/cm^3$. As used herein, the density of the negative electrode means the density of the molded negative electrode mixture. The negative electrode mixture contains the alloying material, which is the active material, as an essential component, and a conductive agent or a binder as an optional component. Also, the porosity of the negative electrode is preferably 16 to 43%. The porosity of the negative electrode as used herein refers to the porosity of the molded negative electrode mixture.

The present invention also relates to a method for producing a non-aqueous electrolyte secondary battery, including the steps of: producing a positive electrode disc including a positive electrode active material capable of electrochemically absorbing and desorbing Li; producing a negative electrode disc including a negative electrode active material capable of electrochemically absorbing and desorbing Li; and placing the positive electrode disc, the negative electrode disc and a non-aqueous electrolyte in a coin-shaped battery case. The step of producing the negative electrode disc includes the steps of: (a) applying a shearing force by a mechanical alloying method to a raw material comprising Si and at least one transition metal element selected from the group consisting of Ti, Zr, Ni, Cu and Fe, to obtain an alloying material that comprises an A phase composed mainly of Si and a B phase comprising an intermetallic compound of the at least one transition metal element and Si, at least one of the A phase and the B phase comprising a microcrystalline or amorphous region, the weight percent of the A phase relative to the total weight of the A phase and the B phase being greater than 40% and not greater than 95%; (b) stirring the alloying material by using balls as a grinding medium, to obtain a powder having a volume cumulative frequency as a function of particle size distribution in which the mean particle size (median diameter: D50) is 0.5 to 20 µm, the 10% diameter (D10) is 0.1 to 5 µm, and the 90% diameter (D90) is 5 to 80 µm; and (c) forming the powder into a disc under pressure.

According to the invention, it is possible to provide a non-aqueous electrolyte secondary battery that has a high capacity and excellent charge/discharge cycle characteristics, and particularly, that has excellent cycling characteristics even when the battery is rapidly charged and discharged. An alloying material with the above-described constitution is thought to have an improved resistance to expansion upon charge.

When the content of the A phase in the alloying material is 40 to 95% by weight, an extremely high capacity is achieved, but the expansion rate upon charge is considered to be significantly high. Even in cases of such large expansion, the above-described construction suppresses degradation of the current collecting network. In particular, when the B phase contains at least one selected from the group consisting of Ti, Zr, Ni, Cu, and Fe, cracking of the particles of alloying material is unlikely to occur during charging, and excellent cycle characteristics can be achieved even in cases of rapid charge/discharge.

It is desirable to granulate the alloying material so as to have a proper particle size distribution. The use of an alloying material having a proper particle size distribution allows homogeneous distribution of the active material inside the negative electrode. Hence, the expansion and contraction of the negative electrode upon charge and discharge also become even, which is advantageous to the cycle life of the non-aqueous electrolyte secondary battery. Also, the use of an alloying material having a proper particle size distribution can provide a negative electrode with a sufficient density (electrode mixture density), thus being advantageous to heightening the capacity of the non-aqueous electrolyte secondary battery.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWING

FIG. 1 is a sectional view of a coin-shaped battery, which is an example of a non-aqueous electrolyte secondary battery according to the present invention.

DETAILED DESCRIPTION OF THE INVENTION

An alloying material capable of electrochemically absorbing and desorbing Li according to the present invention has different characteristics from those of conventional alloying materials. The alloying material of the present invention includes an A phase composed mainly of Si and a B phase comprising an intermetallic compound of a transition metal element and Si. This alloying material lessens the impact of expansion and suppresses the degradation of the electronic conductivity of the resultant negative electrode due to expansion and contraction. Therefore, a negative electrode for a non-aqueous electrolyte secondary battery according to the present invention including this alloying material provides a battery having a high capacity and excellent cycling characteristics.

The A phase is a phase that absorbs and desorbs Li, being capable of electrochemically reacting with Li. The A phase may be composed mainly of Si, and is preferably Si single phase. When the A phase is composed only of Si, the alloying material can absorb and desorb an extremely large amount of Li per unit weight or unit volume. However, since Si itself is a semiconductor, it has poor electronic conductivity. It is therefore effective to add to the A phase a small amount of an element, such as phosphorus (P), boron (B) or hydrogen (H), or a transition metal element, in an amount up to about 5% by weight.

The B phase comprises an intermetallic compound of a transition metal element and Si. An intermetallic compound containing Si has a high affinity for the A phase. Thus, cracking is unlikely to occur at the interface between the A phase and the B phase, particularly when the volume of the alloying material expands during charging. Also, the B phase has a higher electronic conductivity and a higher hardness than the A phase composed mainly of Si. Accordingly, the B phase compensates for the poor electronic conductivity of the A phase and resists expansion stress so as to maintain the shape of the particles of alloying material. Two or more kinds of B phases may be present. That is, two or more kinds of intermetallic compounds each having a different composition may be present as the B phases. For example, when a transition metal element is represented by M, $MSi_2$ and $MSi$ may be present in the particles of alloying material. Also, intermetallic compounds each having a different transition metal element, such as $M^1Si_2$ and $M^2Si_2$ ($M^1$ and $M^2$ not being the same), may be present in the particles of alloying material.

The A phase and/or the B phase comprise a microcrystalline or amorphous region. If a crystalline alloying material is used, the particles thereof tend to become cracked upon Li absorption, which causes a rapid deterioration in the current collecting characteristics of the negative electrode, thereby resulting in degradation of battery characteristics. In contrast, if a microcrystalline or amorphous alloying material is used, the particles thereof are unlikely to become cracked upon expansion due to lithium absorption.

In the microcrystalline or amorphous region constituting the A phase and/or the B phase, the size of crystallites (crystal grains) is preferably not more than 100 nm, and more preferably not less than 5 nm and not more than 100 nm. If the crystallite size is larger than 100 nm, the grain boundaries between crystallites decrease, so that the effect of suppressing particle cracking (intergranular fracture) is reduced. Further, if the crystallite size is less than 5 nm, the grain boundaries between crystallites increase, which may result in a degradation in the electronic conductivity of the alloying material. The electronic conductivity degradation of the alloying material may increase polarization of the negative electrode, thereby lowering the battery capacity.

The state of the A phase and the B phase constituting the alloying material can be determined by the following X-ray diffraction analysis.

First, a sample of alloying material to be measured is placed in a sample holder such that it is not oriented in any particular direction. For example, the alloying material is placed in the sample holder without exerting pressure. Specifically, after placement of the alloying material in the sample holder, the sample holder is covered with a flat plate such that the alloying material does not spill from the sample holder. Thereafter, small vibrations are given to the sample holder such that the alloying material will not spill out from the sample holder even when the flat plate is removed.

The sample to be measured may be in powder form before it is formed into a negative electrode. Alternatively, the sample may be a material that is collected, after the production of a negative electrode, from the electrode material mixture of the negative electrode and is then pulverized in a mortar to make the particles of the material mixture sufficiently apart from one another. In performing an X-ray diffraction analysis, the top surface of the sample contained in the sample holder, which is the incidence plane of the X rays, is made flat, and the flat sample surface is caused to agree with the rotation axis of a goniometer. Such an arrangement can minimize measurement errors of diffraction angle and intensity.

The sample prepared in the above manner is subjected to an X-ray diffraction analysis in the range of diffraction angle $2\theta$ of 10° to 80, with CuKα as the X ray source. It is determined whether or not the resultant diffraction spectrum has peaks attributed to the crystal faces of the A phase and/or the B phase.

For example, in the case of a phase comprising Si which is not amorphous, its diffraction spectrum reflects the crystal faces of Si, showing a peak attributed to the crystal face (111) at a diffraction angle $2\theta=28.4°$, a peak attributed to the crystal face (220) at 47.3°, a peak attributed to the crystal face (311)

at 56.1°, a peak attributed to the crystal face (400) at 69.1°, and a peak attributed to the crystal face (331) at 76.4°. Also, the peak appearing at diffraction angle 2θ=28.4°, which is attributed to the crystal face (111), often has the highest intensity. However, if the phase comprises a microcrystalline region, a sharp peak does not appear, and a relatively broad peak appears. On the other hand, if an alloying material comprises an amorphous region, the X-ray diffraction spectrum of particles of such an alloying material shows a broad halo pattern such that the half width is not discernable.

Crystallite size can be determined by X-ray diffraction analysis. Specifically, in an X-ray diffraction spectrum of particles of alloying material, the half width of a peak attributed to each phase is obtained, and crystallite size is calculated from the half width thus obtained and the following Scherrer equation. If there are a plurality of peaks attributed to each phase, the half width of the most intense peak is obtained, and the Scherrer equation is applied to this half width.

Crystallite size D is given by the following Scherrer equation (1):

$$D(nm) = 0.9 \times \lambda / (\beta \times \cos \theta) \quad (1)$$

wherein λ=the wavelength of X rays (nm) (1.5405 nm for CuKα), β=the half width of the above peak (rad), and θ=the half value of the above peak angle 2θ (rad).

Generally, the most intense peak in the range of diffraction angle 2θ of 10° to 80° may be noted, but it is more preferred that the most intense peak in the range of diffraction angle 2θ of 20° to 35° be noted.

When an X-ray diffraction analysis of an alloying material is performed with CuKα rays as the radiation source, the most intense diffraction peak in the range of diffraction angle 2θ=10° to 80° or 2θ=20° to 35° of the resultant diffraction spectrum desirably has a half width of 0.09° or more. In this case, crystallite size can be determined to be 100 nm or less.

In addition to the above procedure, for example, an AFM (atomic force microscope) or a TEM (transmission electron microscope) may be used to observe a section of an alloying material particle, whereby the size of crystallites can be directly measured. Also, the ratio between the A phase and the B phase in an alloying material (phase composition) may be measured by EDX (energy dispersive X-ray spectroscopy (EDS)) or the like.

In the active material, the weight percent of the A phase relative to the total weight of the A phase and the B phase is greater than 40% and not greater than 95%. When the weight percent of the A phase is greater than 40%, a high capacity can be achieved effectively. Also, when the weight percent of the A phase is 95% or less, the low electronic conductivity of the A phase can be compensated for by the B phase; the shape of particles of alloying material can be maintained effectively; and the particles of alloying material can be easily made microcrystalline or amorphous. From the viewpoint of making these effects more remarkable, the weight percent of the A phase relative to the total weight of the A phase and the B phase is desirably not less than 65% and not more than 85%, and more preferably not less than 70% and not more than 80%.

The transition metal element in the B phase is at least one selected form the group consisting of Ti, Zr, Ni, Cu, and Fe, and preferably at least one selected from the group consisting of Ti and Zr. Silicides of these elements have a higher electronic conductivity and a higher hardness than suicides of other elements.

The Si content in the alloying material according to the present invention is preferably at least 60% by weight. When the weight percent of Si in the alloying material is 60% or more, Si and the transition metal form an intermetallic compound (silicide) such that the A phase exceeds 40% by weight. Therefore, it becomes possible to effectively realize a high capacity.

In the following, preferable Si contents for respective transition metal elements are described.

When the transition metal element is Ti, the Si content in the alloying material is desirably 72.4 to 97.7% by weight. It should be noted that when the transition metal element is Ti, it is preferred that the B phase contain $TiSi_2$.

When the transition metal element is Zr, the Si content in the alloying material is desirably 62.8 to 96.9% by weight.

When the transition metal element is Ni, the Si content in the alloying material is desirably 69.4 to 97.45% by weight.

When the transition metal element is Cu, the Si content in the alloying material is desirably 68.2 to 97.35% by weight.

When the transition metal element is Fe, the Si content in the alloying material is desirably 70 to 97.5% by weight.

In terms of the balance between capacity and cycle characteristics, the mean particle size (median diameter: D50) of the alloying material in volume cumulative frequency as a function of particle size distribution is preferably 0.5 to 20 μm, and more preferably 1 to 10 μm. If the mean particle size exceeds 20 μm, the distribution of the active material inside the negative electrode becomes uneven, so that expansion and contraction of the negative electrode upon charge and discharge tend to become uneven. The uneven expansion and contraction of the negative electrode affects the current collecting property, which may be disadvantageous to the cycle characteristics. Also, if the mean particle size is less than 0.5 μm, it is difficult to increase the negative electrode density, and it may be disadvantageous to the cycle characteristics.

In terms of the balance between capacity and cycle characteristics, the 10% diameter (D10) and the 90% diameter (D90) of the alloying material in volume cumulative frequency as a function of particle size distribution are preferably 0.1 to 5 μm and 5 to 80 μm, respectively, more preferably 0.2 to 1 μm and 10 to 50 μm, and even more preferably 0.2 to 0.9 μm and 11 to 50 μm, respectively.

The alloying material having the above-described particle size distribution is particularly suitable for producing a negative electrode disc for use in a coin-shaped non-aqueous electrolyte secondary battery. The negative electrode disc is produced by molding a negative electrode mixture containing an alloying material under pressure. The negative electrode mixture can contain, for example, a binder or a conductive agent.

In such an alloying material, the occurrence of cracking of its particles is remarkably suppressed, because translocation movement of the A phase due to its expansion upon Li absorption is stopped by the grain boundary between crystallites. In this way, by suppressing the cracking of the particles of the alloying material contained in the negative electrode, it is possible to obtain a non-aqueous electrolyte secondary battery that undergoes little deterioration with charge/discharge cycles.

The production method of an alloying material according to the present invention is not particularly limited. One example is mechanical alloying described, for example, in Kinzoku Zairyo Katsuyou Jiten (metal material application manual) (Industrial Research Center of Japan, Inc. 870(1999)), and other examples include casting, gas atomization, liquid quenching, ion beam sputtering, vacuum deposition, plating, and gas phase chemical reaction. Among them, mechanical alloying, in which a raw material containing Si and a raw material containing a transition metal element are mixed together and subjected to a mechanical alloying operation, is particularly preferable in terms of facilitating control of the crystallite state of each phase.

Also, before performing a mechanical alloying operation, a step of melting a mixture of raw materials and quenching the melt for solidification may be performed. However, mechanical alloying, in which a mixture of a raw material containing Si and a raw material containing a transition metal element is subjected to a mechanical alloying operation without melting and quenching, is particularly preferable, in order to efficiently alloy Si with a transition metal and efficiently realize refinement of crystallite size.

The raw materials for the alloying materials are not particularly limited, but materials composed of a simple substance, alloys, solid solutions, and intermetallic compounds may be used, for example.

Mechanical alloying is a method of synthesizing an alloying material in a dry atmosphere. Alloying materials produced by mechanical alloying are characterized by having a very wide particle size distribution broadening. It is thus desirable to apply a granulating treatment to the alloying materials obtained, in order to control the particle size distribution.

Granulating methods include, for example, sieving and sedimentation. Sieving is a method of passing an alloying material through a sieve of a predetermined mesh size to remove particles larger than the mesh size. Sedimentation utilizes the difference in sedimentation rate of solid particles having different sizes in a fluid medium. These classifications, such as sieving or sedimentation, however, suffer from a drawback of being unable to make effective use of particles whose sizes are out of a predetermined range, thereby being disadvantageous in terms of costs.

It is thus preferable to perform a treatment of grinding the alloying material as the granulating method. Grinding techniques have long been used in various industrial fields, but it is important to select an efficient grinding method depending on the object to be ground. By controlling the grinding conditions, it is also possible to simultaneously perform: (1) cracking agglomerated particles to primary particles and adjusting their particle size; (2) mixing and dispersing several kinds of particles to get a desired uniformity; and (3) modifying and activating particle surface.

Exemplary devices used in mechanical alloying and grinding of the alloying material include attritors, vibration mills, ball mills, planetary ball mills, bead mills, and jet mills.

The grinding methods are roughly classified into dry grinding and wet grinding. Either method may be used in the present invention.

Dry grinding is advantageous in that it has a large coefficient of friction, thereby producing a grinding effect that is several times more powerful than wet grinding. A disadvantage of dry grinding is that an alloying material is apt to adhere to a grinding medium, such as balls, placed in a grinding container together with the alloying material and the walls of the grinding container. Also, since agglomeration of the alloying material particles themselves occurs, grinding is hampered, which may result in a relatively wide particle size distribution broadening.

On the other hand, according to wet grinding, a liquid such as water is added to an alloying material to form a slurry in grinding the alloying material. Therefore, the adhesion of the alloying material to the grinding medium such as balls and the grinding container walls are unlikely to occur. Further, since the alloying material is dispersed in the liquid, it is easier to narrow the particle size distribution broadening of the alloying material than dry grinding.

In performing wet grinding, a grinding device having a simple structure, such as a ball mill, may be used. Also, as the grinding medium placed in the grinding container together with the alloying material, media made of various materials can be readily obtained. Since the alloying material is ground by contacting points of the balls, it is evenly ground at a great number of locations thereof.

In view of the above, it is desirable to produce an alloying material by dry mechanical alloying and then control the particle size distribution of the alloying material by wet grinding using, for example, a ball mill, in preparing the alloying material. For example, it is desirable to produce an alloying material by dry mechanical alloying using a vibration ball mill or the like and then subjecting the resultant alloying material to wet grinding using a ball mill. According to such wet grinding using a ball mill, it is possible to adjust the mean particle size (D50) of the alloying material to 0.5 to 20 μm, the 10% diameter (D10) to 0.1 to 5 μm, and the 90% diameter (D90) to 5 to 80 μm in volume cumulative frequency as a function of particle size distribution.

Wet grinding facilitates formation of a thin surface oxide film that prevents oxidation of the alloying material. Also, wet grinding allows the surface oxide film to be formed on the alloying material in a gentle manner. It is thus unnecessary to strictly control the oxygen concentration of the atmosphere during grinding. However, wet grinding needs a step of solid/liquid separating and a drying step in order to remove liquid contents.

The mean particle size (the median diameter: D50), the 10% diameter (D10) and the 90% diameter (D90) of the alloying material in volume cumulative frequency as a function of particle size distribution can be measured by a particle size distribution analyzer utilizing laser scattering. The size of irregular-shape particles can be expressed, for example, by circle equivalent diameter and Feret diameter. Herein, the circle equivalent diameter means the diameter of the equivalent circle. The equivalent circle means a circle having the same area as the projected particle. The particle size distribution can be measured by using microtracking or particle image analysis.

Microtracking is a method in which an alloying material dispersed in a medium such as water is irradiated with laser beams to examine their diffraction state. According to microtracking, all of the mean particle size (the median diameter: D50), the 10% diameter (D10) and the 90% diameter (D90) in volume cumulative frequency as a function of particle size distribution can be measured. Besides the laser scattering, the particle size distribution can also be determined by processing the image of the alloying material obtained by scanning electron microscope (SEM).

In addition to the above-described alloying material, the negative electrode according to the present invention can include a conductive agent, if necessary. Examples of the conductive agent include: graphites such as natural graphite (e.g., flake graphite), artificial graphite, and exfoliated graphite; carbon blacks such as acetylene black, ketjen black, channel black, furnace black, lamp black, and thermal black; conductive fibers such as carbon fiber and metal fiber; metal powders such as copper powder and nickel powder; and organic conductive materials such as polyphenylene derivatives. They may be used singly or in combination of two or more of them. Among them, graphites are preferable in terms of density, stability with respect to electrolytes, capacity, cost, and the like.

When the negative electrode includes a conductive agent, the amount of the conductive agent is not particularly limited, but is preferably 1 to 50 parts by weight per 100 parts by weight of the alloying material, and more preferably 1 to 40 parts by weight. It should be noted that since the alloying material of the present invention is electronically conductive itself, a negative electrode having sufficient conductivity can be obtained even without using a conductive agent.

The negative electrode can be obtained, for example, by mixing an alloying material and, if necessary, a conductive agent, a binder and a dispersion medium to form a negative electrode material mixture, molding the mixture into a predetermined shape or applying the mixture onto a current collector, and drying it.

The binder is preferably a material that is electrochemically inactive with respect to Li in the potential range of the negative electrode and has as little an effect as possible on other substances. Suitable examples include styrene-butadiene copolymer rubber, polyacrylic acid, polyethylene, polyurethane, polymethyl methacrylate, polyvinylidene fluoride, polytetrafluoroethylene, carboxymethyl cellulose, and methyl cellulose. The volume of the negative electrode used in the present invention changes greatly during charging. Hence, styrene-butadiene copolymer rubber, which is capable of accommodating volume changes in a relatively flexible manner, and polyacrylic acid, which is apt to maintain strong adhesion even upon volume change, are preferred, for example. With respect to the amount of the binder to be added, a greater amount is more preferable, in terms of maintaining the structure of the negative electrode; however, in terms of enhancing battery capacity and discharge characteristics, a lesser amount is preferable.

The non-aqueous electrolyte secondary battery of the present invention includes the above-described negative electrode, a positive electrode capable of electrochemically absorbing and desorbing Li, and a non-aqueous electrolyte.

The non-aqueous electrolyte may be a gel electrolyte or a solid electrolyte, but generally is an electrolyte including a solute dissolved in a non-aqueous solvent. Examples of the non-aqueous solvent include: cyclic carbonates such as ethylene carbonate (EC), propylene carbonate (PC), butylene carbonate (BC), and vinylene carbonate (VC); chain carbonates such as dimethyl carbonate (DMC), diethyl carbonate (DEC), ethyl methyl carbonate (EMC), and dipropyl carbonate (DPC); aliphatic carboxylic acid esters such as methyl formate, methyl acetate, methyl propionate, and ethyl propionate; γ-lactones such as γ-butyrolactone; chain ethers such as 1,2-dimethoxyethane (DME), 1,2-diethoxyethane (DEE), and ethoxymethoxyethane (EME); cyclic ethers such as tetrahydrofuran and 2-methyltetrahydrofuran; aprotic organic solvents such as dimethyl sulfoxide, 1,3-dioxolane, formamide, acetamide, dimethylformamide, dioxolane, acetonitrile, propionitrile, nitromethane, ethyl monoglyme, phosphoric acid triester, trimethoxymethane, dioxolane derivatives, sulfolane, methylsulfolane, 1,3-dimethyl-2-imidazolidinone, 3-methyl-2-oxazolidinone, propylene carbonate derivatives, tetrahydrofuran derivatives, ethyl ether, 1,3-propanesultone, anisole, dimethyl sulfoxide, N-methyl-2-pyrrolidone, butyl diglyme, methyl tetraglyme, and γ-butyrolactone derivatives. It is preferred that they be used in combination.

Examples of the solute to be dissolved in the non-aqueous solvent include $LiClO_4$, $LiBF_4$, $LiPF_6$, $LiAlCl_4$, $LiSbF_6$, LiSCN, $LiCF_3SO_3$, $LiCF_3CO_2$, $Li(CF_3SO_2)_2$, $LiAsF_6$, $LiB_{10}Cl_{10}$, lithium lower aliphatic carboxylates, LiCl, LiBr, LiI, chloroboran lithium, lithium tetraphenylborate, and imides. They may be used singly or in combination of two or more of them. The amount of the solute to be dissolved in the non-aqueous solvent is not particularly limited, but it is preferably 0.2 to 2.0 mol/L, and more preferably 0.5 to 1.5 mol/L.

The positive electrode may be any positive electrode that is conventionally suggested or disclosed in related arts, without any particular limitation. The positive electrode generally includes a positive electrode active material, a conductive agent and a binder. The positive electrode active material may be any positive electrode active material that is conventionally suggested or disclosed in related arts, without any particular limitation; however, a lithium containing transition metal compound is preferred. Typical examples of the lithium containing transition metal compound include, but are not limited to, $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, $Li_xMn_{2-y}O_4$, $LiCo_{1-x}Mg_xO_2$, $LiNi_{1-y}Co_yO_2$, $LiNi_{1-y}Co_yMn_zO_2$. In these lithium containing transition metal compounds, M is at least one selected from the group consisting of Na, Mg, Sc, Y, Mn, Fe, Co, Ni, Cu, Zn, Al, Cr, Pb, Sb, and B, x is 0 to 1.2, y is 0 to 0.9, and z is 2.0 to 2.3. Also, x increases or decreases when a battery is charged or discharged. It is also possible to use, as the positive electrode active material, transition metal chalcogenides, vanadium oxides and their lithium compounds, niobium oxides and their lithium compounds, conjugated polymers including an organic conductive substance, chevrel phase compounds, and the like. A plurality of active materials can be combined for use.

The separator to be interposed between the positive electrode and the negative electrode is made of a microporous thin film having a large ion-permeability, a predetermined mechanical strength, and an electron insulating property. A microporous thin film made of polypropylene, polyethylene, polyphenylene sulfide, polyethylene terephthalate, polyamide, polyimide, or the like is preferably used, since such materials have a high resistance to non-aqueous solvents and a good hydrophobic property. These materials may be used alone or in combination of two or more of them. In terms of manufacturing costs, the use of an inexpensive polypropylene or the like is advantageous. Also, in the case of providing a battery with reflow resistance, for example, polyethylene terephthalate, polyamide, polyimide, which have a heat deformation temperature of 230° C. or higher, are preferably used. Further, a sheet made of a glass fiber or the like, non-woven fabric, woven fabric, or the like is used. The thickness of the separator is generally 10 to 300 μm. The porosity of the separator is determined according to the electronic conductivity, ionic permeability, material, and the like, but it is generally preferred that the porosity be 30 to 80%.

The present invention is applicable to non-aqueous electrolyte secondary batteries of various shapes, such as cylindrical, flat, coin, and rectangular shapes, and the battery shape is not particularly limited. The present invention is applicable to various sealing types of batteries, including batteries in which power generating elements, such as electrodes and an electrolyte, are placed in a metal battery case or a case made of a laminated film. There is no particular limitation with respect to how batteries are sealed. It should be noted, however, that the present invention is particularly preferable in a coin-shaped non-aqueous electrolyte secondary battery. The coin-shaped non-aqueous electrolyte secondary battery includes a coin-shaped battery case comprising a positive electrode can and a negative electrode can, and the positive electrode and the negative electrode are in disc form and are placed in the positive electrode can and the negative electrode can, respectively. A separator is interposed between the positive electrode and the negative electrode. The opening edge of the positive electrode can is fitted to the opening edge of the negative electrode can with an insulating gasket interposed therebetween, so that the battery is sealed. The sealing of the battery is done after the positive electrode, the negative electrode and the separator are impregnated with a lithium-ion conductive non-aqueous electrolyte.

In the following, the present invention will be specifically described by way of Examples and Comparative Examples. The following Examples, however, only show preferable embodiments of the present invention, and hence, the present invention is not limited to the following Examples.

Example 1

In Examples and Comparative Examples, negative electrodes and coin-shaped batteries were produced in the following manner, and their cycle life and discharge capacity were evaluated.

(1) Alloying Material Preparation

Ti, Zr, Ni, Cu, and Fe were used in metallic form as raw materials for the transition metal element M. Each metal was in powder form having a purity of 99.9% and a particle size of 100 to 150 μm. Also, a Si powder having a purity of 99.9% and a mean particle size of 3 μm was used as the raw material for Si.

These raw materials were mixed together in the following weight ratios such that the weight of the A phase relative to the total weight of the A phase and the B phase in the resultant alloying material would amount to approximately 80% on the assumption that $MSi_2$ would form as the B phase.

Ti:Si=9.2:90.8

Zr:Si=12.4:87.6

Ni:Si=10.2:89.8

Cu:Si=10.6:89.4

Fe:Si=10.2:89.8

Each powder mixture of 3.5 kg was placed in the container of a vibration mill (Model FV-20, manufactured by Chuo Kakohki Co., Ltd.). Then, 2-cm-diameter stainless steel balls were placed therein such that they occupied 70% of the internal volume of the container. After the container was evacuated, Ar (purity 99.999%, manufactured by Nippon Sanso Corporation) was introduced thereinto so as to provide a pressure of 1 atmosphere. Under such conditions, a mechanical alloying operation was performed. The operating conditions of the mill were: an amplitude of 8 mm and a revolution frequency of 1200 rpm. Under such conditions, the mechanical alloying operation was performed for 80 hours.

The Ti—Si, Zr—Si, Ni—Si, Cu—Si, and Fe—Si alloying materials obtained by the above procedure were removed from the container, and their particle size distributions were examined. It was found that these alloying materials had a wide particle size distribution of 0.5 am to 80 μm. These alloying materials were classified with a sieve (10 μm mesh size), which gave a Ti—Si alloying material (hereinafter referred to as "alloying material a"), a Zr—Si alloying material ("alloying material b"), a Ni—Si alloying material ("alloying material c"), a Cu—Si alloying material ("alloying material d"), and an Fe—Si alloying material ("alloying material e"), each having a maximum particle size of 8 μm and a mean particle size of 5 μm.

Using CuKα rays as the radiation source, alloying material a was measured by X-ray diffraction analysis, and the resultant spectrum showed that it was microcrystalline. In this X-ray diffraction spectrum, the half width of the most intense diffraction peak in the range of diffraction angles 2θ=10° to 80° was obtained. The size of the crystal grains (crystallites) of alloying material a was calculated from the half width thus obtained and the Scherrer equation. The grain size was determined to be 10 nm.

The results of the X-ray diffraction analysis indicated that a Si-only phase (A phase) and a $TiSi_2$ phase (B phase) were present in alloying material a. When the ratio between the Si-only phase and the $TiSi_2$ phase was calculated on the assumption that alloying material a was composed of these two phases only, it was found that $Si:TiSi_2$=80:20 (weight ratio).

The alloying materials b, c, d, and e were also measured by X-ray diffraction analysis, and their crystallite size and the ratio between the A phase and the B phase (weight ratio) were calculated. The results obtained were the same as for alloying material a.

A section of the alloying material a was observed with a transmission electron microscope (TEM). As a result, it was found that the Si-only phase, composed of an amorphous region and crystal grains (crystallites) with a grain size of approximately 10 nm, and the $TiSi_2$ phase, composed of crystal grains (crystallites) with a grain size of approximately 15 to 20 nm, were present. The alloying materials b, c, d, and e were measured in the same manner, and the results obtained were the same for alloying material a.

In this example, the maximum particle size and mean particle size of the alloying material were measured, using a particle size distribution analyzer HRA (MODEL No. 9320-X100) available from Microtrack Incorporated. Before measuring the particle size, the alloying material was mixed with water and ultrasonically dispersed for 180 seconds. This also applies to the following Examples and Comparative Examples.

(2) Negative Electrode Preparation

Using the alloying materials a to e, graphite and a binder, negative electrodes were produced in the following manner.

Each alloying material was mixed with graphite (SP-5030, manufactured by Nippon Graphite Industries, Ltd.), a binder of polyacrylic acid (average molecular weight: 150,000, manufactured by Wako Pure Chemical Industries, Ltd.) in a weight ratio of 70.5:21.5:7, to prepare a negative electrode material mixture. This negative electrode material mixture was formed into pellets of 4 mm in diameter and 0.3 mm in thickness, and the negative electrode pellets were dried at 200° C. for 12 hours. The dried negative electrode pellets had a thickness of 300 μm, a porosity of 26.6%, and a density of 1.721 g/cm³. The negative electrode pellets formed from the alloying materials designated as a to e were negative electrodes a to e, respectively.

(3) Positive Electrode Preparation

Manganese dioxide was mixed with lithium hydroxide in a molar ratio of 2:1, and the mixture was baked in air at 400° C. for 12 hours, to obtain lithium manganate.

The lithium manganate thus obtained was mixed with a conductive agent of carbon black and a binder of fluorocarbon resin (polytetrafluoroethylene) in a weight ratio of 88:6:6, to obtain a positive electrode material mixture. The binder used was an aqueous dispersion. This positive electrode material mixture was formed into pellets of 4 mm in diameter and 1.0 mm in thickness, and the positive electrode pellets were dried at 250° C. for 12 hours.

(4) Coin-Shaped Battery Production

Coin-shaped non-aqueous electrolyte secondary batteries as illustrated in FIG. 1 were produced. These batteries were 6.8 mm in outer diameter and 2.1 mm in thickness.

Positive electrode case 1 doubles as a positive electrode terminal and is made of stainless steel having good corrosion resistance. Negative electrode case 2 doubles as a negative electrode terminal and is made of stainless steel, which is the same material as that of the positive electrode case 1. Gasket 3 insulates the positive electrode case 1 from the negative electrode case 2 and is made of polypropylene. Pitch is applied to the parts of the gasket 3 in contact with the positive electrode case 1 and the negative electrode case 2. Carbon pastes 8*a* and 8*b* are applied to the inner faces of the positive electrode case 1 and the negative electrode case 2.

The alloying material (active material) contained in the pelletized negative electrode 5 must be alloyed with lithium. Thus, a lithium foil 4 was attached under pressure to the surface of the pelletized negative electrode 5 when the battery was assembled. After the battery assembly, in the presence of an electrolyte, the lithium foil 4 was caused to be absorbed electrochemically into the negative electrode, so that a lithium alloy was formed in the negative electrode 5.

A separator 6 made of a polyethylene non-woven fabric was interposed between the positive electrode 7 and the negative electrode 5 obtained in the above manner. Batteries produced by using the pelletized negative electrodes a to e were designated as batteries a to e, respectively. These batteries had a design capacity of 6 mAh.

The electrolyte was prepared by dissolving $LiN(CF_3SO_2)_2$ at a concentration of 1 mol/L in a solvent mixture composed of propylene carbonate (PC), ethylene carbonate (EC) and dimethoxyethane (DME) in a volume ratio of PC:EC: DME=1:1:1.

(5) Battery Evaluation

In a constant temperature room at 20° C., batteries a to e were charged and discharged at a constant current. The charge current was 2 C (1 C is 1 hour-rate current), the discharge current was 0.2 C, and the battery voltage was in the range of 2.0 to 3.3 V. This charge/discharge cycle was repeated 200 times.

The discharge capacity at the second cycle was designated as the initial discharge capacity. The ratio of the discharge capacity at the 200th cycle to the discharge capacity at the second cycle was expressed as a percentage (%), which was defined as capacity maintenance rate. The closer the capacity maintenance rate is to 100(%), the better the cycle life is. Table 1 shows the results of the initial discharge capacity and capacity maintenance rate.

TABLE 1

|           | A phase | B phase  | Initial discharge capacity (mAh) | Capacity maintenance rate (%) |
|-----------|---------|----------|----------------------------------|-------------------------------|
| Battery a | Si      | $TiSi_2$ | 6                                | 95                            |
| Battery b | Si      | $ZrSi_2$ | 5.9                              | 90                            |
| Battery c | Si      | $NiSi_2$ | 5.9                              | 90                            |
| Battery d | Si      | $CuSi_2$ | 5.8                              | 88                            |
| Battery e | Si      | $FeSi_2$ | 5.9                              | 88                            |

Comparative Example 1

Co or Mn was used as a metal raw material of the transition metal element M. Each metal was in powder form having a purity of 99.9% and a particle size of 100 to 150 μm.

A Si powder having a purity of 99.9% and a mean particle size of 3 μm was used as the raw material of Si.

These raw materials were mixed together in the following weight ratios such that the ratio of the weight of the A phase to the total weight of the A phase and the B phase in the resultant alloying material (expressed as a percentage) would amount to approximately 80% on the assumption that $MSi_2$ would form as the B phase.

Co:Si=10.2:89.8
Mn:Si=9.9:90.1

The respective powder mixtures were subjected to a mechanical alloying operation under the same conditions as those of Example 1. The resultant powders were then classified in the same manner, to obtain a Co—Si alloying material (hereinafter referred to as "alloying material f") and a Mn—Si alloying material ("alloying material g"), each having a maximum particle size of 8 μm and a mean particle size 5 μm. Also, using the alloying materials f and g, pelletized negative electrodes f and g were produced in the same manner as in Example 1. Using them, batteries f and g were produced and then evaluated. Table 2 shows the results.

TABLE 2

|           | A phase | B phase  | Initial discharge capacity (mAh) | Capacity maintenance rate (%) |
|-----------|---------|----------|----------------------------------|-------------------------------|
| Battery f | Si      | $CoSi_2$ | 5.9                              | 50                            |
| Battery g | Si      | $MnSi_2$ | 5.8                              | 50                            |

The batteries a to e of Example 1 exhibited higher capacity maintenance rates at the 200th cycle than the batteries f and g of Comparative Example 1, and therefore they had better life characteristics when a rapid charge/discharge cycle was repeated.

Although the details are not yet known, the main cause of the cycle characteristic deterioration is thought to be the degradation of the current collecting network due to charging and discharging. That is, the expansion and contraction of the alloying material upon lithium absorption and desorption breaks the connections between the particles in the electrode, so that the particles become free or dislocated, thereby impairing the current collecting property and increasing the resistance of the whole negative electrode. Such deterioration is remarkable when a rapid charge/discharge at a large current is repeated.

However, in Example 1, such deterioration is suppressed, probably because the resistance of the alloying materials to expansion during charging is improved. Also, a comparison of Tables 1 and 2 indicates that the resistance of the alloying materials to expansion varies remarkably according to the kind of the transition metal. An alloying material containing Ti, Zr, Ni, Cu, or Fe has a higher electronic conductivity and a higher hardness than an alloying material containing Co or Mn, and such properties are considered to suppress the cracking during charging and improve the resistance of the alloying material to expansion during charging.

However, the batteries of Comparative Example 1 exhibited sufficiently good cycle characteristics under ordinary charge/discharge cycle conditions (for example, charge/discharge at a 1 hour-rate current). Therefore, these batteries are expected to have better performance than batteries using conventional alloying materials even when they are required to be charged and discharged rapidly.

Example 2

In this example, the crystallite size of alloying materials was examined in detail.

The crystallite size of alloying materials was varied as shown in Table 3 below by changing the conditions of the mechanical alloying operation (frequency and operation time). In the same manner as in Example 1 except for the variations in crystallite size, various alloying materials were produced such that the weight ratio between the A phase and B phase would be 80:20. These alloying materials were then classified, to obtain a Ti—Si alloying material, a Zr—Si alloying material, a Ni—Si alloying material, a Cu—Si alloying material and an Fe—Si alloying material, each having a maximum particle size of 8 µm and a mean particle size of 5 µm.

In the same manner as in Example 1, the crystallite size of the A phase was calculated from the half width of the most intense peak obtained by X-ray diffraction analysis of each alloying material and the Scherrer equation.

In Table 3, although the crystallite size of only the A phase is shown, the crystallite size of the B phase was the same as that of the A phase.

The conditions of the mechanical alloying operation were controlled, for example, as follows.

In obtaining an alloying material having a crystallite size of 0 nm, the operating conditions were: an amplitude of 8 mm, a revolution frequency of 1200 rpm, and an operation time of 2000 hours. When an X-ray diffraction spectrum showed an amorphous spectrum and had no peak whose half width was recognizable, the crystallite size was determined to be 0 nm.

In obtaining an alloying material having a crystallite size of approximately 5 nm, the operating conditions were: amplitude of 8 mm, revolution frequency of 1200 rpm, and operation time of 300 hours.

In obtaining an alloying material having a crystallite size of 50 nm, the operating conditions were: amplitude 8 mm, revolution frequency of 1200 rpm, and operation time of 4 hours.

In obtaining an alloying material having a crystallite size of 100 nm, the operating conditions were: amplitude 8 mm, revolution frequency of 1200 rpm, and operation time of 1 hour.

In obtaining an alloying material having a crystallite size of approximately 200 nm, the operating conditions were: amplitude 8 mm, revolution frequency of 1200 rpm, and operation time of 0.3 hour.

Pelletized negative electrodes were produced in the same manner as in Example 1 except for the use of these alloying materials. Using the resultant negative electrodes, batteries were produced and then evaluated. Table 3 shows the results.

TABLE 3

| A phase | B phase | Crystallite size of A phase (nm) | Initial discharge capacity (mAh) | Capacity maintenance rate (%) |
|---|---|---|---|---|
| Si | $TiSi_2$ | 0 | 5.5 | 95 |
| Si | $TiSi_2$ | 5 | 5.9 | 95 |
| Si | $TiSi_2$ | 50 | 6 | 93 |
| Si | $TiSi_2$ | 100 | 6 | 90 |
| Si | $TiSi_2$ | 200 | 6 | 50 |
| Si | $ZrSi_2$ | 0 | 5.5 | 95 |
| Si | $ZrSi_2$ | 5 | 5.9 | 95 |
| Si | $ZrSi_2$ | 50 | 6 | 93 |
| Si | $ZrSi_2$ | 100 | 6 | 90 |
| Si | $ZrSi_2$ | 200 | 6 | 50 |
| Si | $NiSi_2$ | 0 | 5.5 | 95 |
| Si | $NiSi_2$ | 5 | 5.9 | 95 |
| Si | $NiSi_2$ | 50 | 6 | 93 |
| Si | $NiSi_2$ | 100 | 6 | 90 |
| Si | $NiSi_2$ | 200 | 6 | 50 |
| Si | $CuSi_2$ | 0 | 5.5 | 95 |
| Si | $CuSi_2$ | 5 | 5.9 | 95 |
| Si | $CuSi_2$ | 50 | 6 | 93 |
| Si | $CuSi_2$ | 100 | 6 | 90 |
| Si | $CuSi_2$ | 200 | 6 | 50 |
| Si | $FeSi_2$ | 0 | 5.5 | 95 |
| Si | $FeSi_2$ | 5 | 5.9 | 95 |
| Si | $FeSi_2$ | 50 | 6 | 93 |
| Si | $FeSi_2$ | 100 | 6 | 90 |
| Si | $FeSi_2$ | 200 | 6 | 50 |

Table 3 clearly indicates that when the crystallite size of the A phase is 100 nm or less, the capacity is high and the capacity maintenance rate after 200 cycles is high. When the crystallite size is larger than 100 nm, the alloying material tends to become cracked due to its expansion and contraction during charging and discharging, and this is considered to be the reason why the current collecting network deteriorated. Also, when the crystallite size is smaller than 5 nm, the capacity tended to deteriorate although slightly. This slight capacity deterioration probably occurs because the excessively small crystallite size increased the grain boundary of the crystallites, thereby lowering the conductivity and increasing the resistance during charging and discharging. It is therefore desirable that the crystallite size be 5 nm to 100 nm. Table 3 also indicates that when the crystallite size is 5 nm to 50 nm, the capacity maintenance rate after 200 cycles becomes higher, and the capacity also becomes larger.

Example 3

In this Example, in a diffraction spectrum obtained by performing an X-ray diffraction analysis of an alloying material with CuKα rays as the radiation source, the half width of the most intense diffraction peak in the range of diffraction angle 2θ=10° to 80° was examined in detail.

The half width of the most intense diffraction peak was varied as shown in Table 4 below by changing the conditions of the mechanical alloying operation (frequency and operation time). In the same manner as in Example 1, except for the variations in half width, various alloying materials were produced such that the weight ratio between the A phase and B phase would become 80:20. These materials were then classified, to obtain a Ti—Si alloying material, a Zr—Si alloying material, a Ni—Si alloying material, a Cu—Si alloying material and an Fe—Si alloying material, each having a maximum particle size of 8 µm and a mean particle size of 5 µm.

In Table 4, although the half width of only the peak attributed to the A phase is shown, the half width of the peak attributed to the B phase was also the same as that of the A phase.

The conditions of the mechanical alloying operation were controlled, for example, as follows.

In obtaining an alloying material having a half width of 0.05°, the operating conditions were: amplitude of 8 mm, revolution frequency of 1200 rpm, and operation time of 0.35 hour.

In obtaining an alloying material having a half width of 0.1°, the operating conditions were: amplitude of 8 mm, revolution frequency of 1200 rpm, and operation time of 1.3 hour.

In obtaining an alloying material having a half width of 0.4°, the operating conditions were: amplitude of 8 mm, revolution frequency of 1200 rpm, and operation time of 18 hours.

In obtaining an alloying material having a half width of 0.5°, the operating conditions were: amplitude of 8 mm, revolution frequency of 1200 rpm, and operation time of 27 hours.

In obtaining an alloying material having a half width of 1°, the operating conditions were: amplitude of 8 mm, revolution frequency of 1200 rpm, and operation time of 100 hours.

In obtaining an alloying material having a half width of 2°, the operating conditions were: amplitude of 8 mm, revolution frequency of 1200 rpm, and operation time of 380 hours.

Pelletized negative electrodes were produced in the same manner as in Example 1 except for the use of these alloying materials. Using the resultant negative electrodes, batteries were produced and then evaluated. Table 4 shows the results of the capacity maintenance rate after 200 cycles.

TABLE 4

| A phase | B phase | Half width (°) | Capacity maintenance rate (%) |
|---|---|---|---|
| Si | TiSi$_2$ | 0.05 | 80 |
| Si | TiSi$_2$ | 0.1 | 95 |
| Si | TiSi$_2$ | 0.4 | 95 |
| Si | TiSi$_2$ | 0.5 | 95 |
| Si | TiSi$_2$ | 1 | 95 |
| Si | TiSi$_2$ | 2 | 95 |
| Si | ZrSi$_2$ | 0.05 | 80 |
| Si | ZrSi$_2$ | 0.1 | 95 |
| Si | ZrSi$_2$ | 0.4 | 95 |
| Si | ZrSi$_2$ | 0.5 | 95 |
| Si | ZrSi$_2$ | 1 | 93 |
| Si | ZrSi$_2$ | 2 | 90 |
| Si | NiSi$_2$ | 0.05 | 80 |
| Si | NiSi$_2$ | 0.1 | 95 |
| Si | NiSi$_2$ | 0.4 | 95 |
| Si | NiSi$_2$ | 0.5 | 95 |
| Si | NiSi$_2$ | 1 | 93 |
| Si | NiSi$_2$ | 2 | 90 |
| Si | CuSi$_2$ | 0.05 | 80 |
| Si | CuSi$_2$ | 0.1 | 95 |
| Si | CuSi$_2$ | 0.4 | 95 |
| Si | CuSi$_2$ | 0.5 | 95 |
| Si | CuSi$_2$ | 1 | 93 |
| Si | CuSi$_2$ | 2 | 90 |
| Si | FeSi$_2$ | 0.05 | 80 |
| Si | FeSi$_2$ | 0.1 | 95 |
| Si | FeSi$_2$ | 0.4 | 95 |
| Si | FeSi$_2$ | 0.5 | 95 |
| Si | FeSi$_2$ | 1 | 93 |
| Si | FeSi$_2$ | 2 | 90 |

Table 4 indicates that when the half width is 0.1° or greater, the capacity maintenance rate after 200 cycles is high. On the other hand, when the half width is less than 0.1°, the alloying material is relatively highly crystalline, i.e., not microcrystalline. It is probably for this reason that the particles of the alloying material became cracked due to expansion and contraction during charging and discharging, and the current collecting network of the negative electrode was damaged.

Example 4

In this example, the ratio of the A phase in an alloying material was examined in detail.

Raw materials were mixed together such that the ratio (as a percentage) of the A phase to the total weight of the A phase and the B phase in the resultant alloying material would amount to 30 to 98% by weight, as listed in Table 5 below, on the assumption that MSi$_2$ would form as the B phase. Except for this, in the same manner as in Example 1, various alloying materials were produced and then classified, to obtain a Ti—Si alloying material, a Zr—Si alloying material, a Ni—Si alloying material, a Cu—Si alloying material, and an Fe—Si alloying material, each having a maximum particle size of 8 μm and a mean particle size of 5 μm.

Using CuKα rays as the radiation source, each alloying material was measured by X-ray diffraction analysis, and the resultant spectrum showed that the material was microcrystalline. Also, in this X-ray diffraction spectrum, the half width of the most intensive diffraction peak in the range of diffraction angle 2θ=10° to 80° was obtained. Based on the half width thus obtained and the Scherrer equation, the size of the crystal grains (crystallites) of each alloying material was calculated. The grain size was determined to be 10 nm.

Pelletized negative electrodes were produced in the same manner as in Example 1, except for the use of these alloying materials. Using the resultant negative electrodes, batteries were produced and then evaluated. Table 5 shows the results of the capacity maintenance rate after 200 cycles.

TABLE 5

| | | Ratio of A phase to the total weight of A phase and B phase (% by weight) | | | | | | | | | | |
|---|---|---|---|---|---|---|---|---|---|---|---|---|
| | | 30 | | 40 | | 50 | | 80 | | 95 | | 98 | |
| A phase | B phase | Upper left: M content(% by weight), Upper right: Si content(% by weight) | | | | | | | | | | | |
| | | Lower left: Discharge capacity(mAh), Lower right: Capacity maintenance rate(%) | | | | | | | | | | | |
| Si | TiSi$_2$ | 32.21 | 67.79 | 27.61 | 72.39 | 23 | 77 | 9.2 | 90.8 | 2.3 | 97.7 | 0.92 | 99.08 |
| Si | | 5.5 | 95 | 5.8 | 95 | 5.9 | 95 | 6 | 95 | 6.1 | 92 | 6.2 | 50 |
| Si | ZrSi$_2$ | 43.31 | 56.69 | 37.1 | 62.9 | 30.9 | 69.1 | 12.38 | 87.62 | 3.09 | 96.91 | 1.24 | 98.76 |
| Si | | 5.5 | 90 | 5.8 | 90 | 5.9 | 90 | 6 | 90 | 6.1 | 88 | 6.2 | 50 |
| Si | NiSi$_2$ | 35.76 | 64.24 | 30.66 | 69.34 | 25.5 | 74.5 | 10.22 | 89.78 | 2.55 | 97.45 | 1.02 | 98.98 |
| Si | | 5.5 | 90 | 5.7 | 90 | 5.8 | 90 | 5.9 | 90 | 6.0 | 88 | 6.2 | 50 |
| Si | CuSi$_2$ | 37.15 | 62.85 | 31.83 | 68.17 | 26.5 | 73.5 | 10.61 | 89.39 | 2.65 | 97.35 | 1.06 | 98.94 |
| Si | | 5.5 | 88 | 5.7 | 88 | 5.8 | 88 | 5.9 | 88 | 6.0 | 86 | 6.2 | 50 |
| Si | FeSi$_2$ | 35.8 | 64.2 | 30.69 | 69.31 | 25.6 | 74.4 | 10.23 | 89.77 | 2.56 | 97.44 | 1.02 | 98.98 |
| Si | | 5.5 | 88 | 5.7 | 88 | 5.8 | 88 | 5.9 | 88 | 6.0 | 86 | 6.2 | 50 |

Table 5 shows that when the ratio of the A phase in the alloying material is less than 95% by weight, the capacity maintenance rate after 200 cycles is high. It also shows that when the ratio of the A phase in the alloying material is smaller than 40% by weight, the capacity of the resultant battery decreases slightly. Accordingly, it has been found that high capacity and good cycle characteristics are mutually compatible when the ratio of the A phase in the alloying material is in the range of 40 to 95% by weight.

Comparative Example 2

Raw materials were mixed together such that the ratio of the A phase to the total weight of the A phase and the B phase in the resultant alloying material would amount to 30 to 98% by weight, as listed in Table 6 below, on the assumption that $MSi_2$ would form as the B phase. Except for this, in the same manner as in Comparative Example 1, various alloying materials were produced and then classified, to obtain a Co—Si alloying material and a Mn—Si alloying material, each having a maximum particle size of 8 μm and a mean particle size of 5 μm.

Using CuKα rays as the radiation source, each alloying material was measured by X-ray diffraction analysis, and the resultant spectrum showed that the alloy was microcrystalline. Also, in this X-ray diffraction spectrum, the half width of the most intense diffraction peak in the range of diffraction angle 2θ=10° to 80° was obtained. Based on the half width thus obtained and the Scherrer equation, the size of the crystal grains (crystallites) of each alloying material was calculated. The grain size was determined to be 10 nm.

Pelletized negative electrodes were produced in the same manner as in Example 1 except for the use of these alloying materials. Using the resultant negative electrodes, batteries were produced and then evaluated. Table 6 shows the results of the capacity maintenance rate after 200 cycles.

Table 6 shows that in the case of using Co or Mn as the transition metal element, when the ratio of the A phase is larger than 40% by weight, the capacity is high, but the capacity maintenance rate after 200 cycles is remarkably low.

This is probably because the use of Co or Mn as the transition metal element does not lead to a large improvement in the resistance of the resultant alloying material to expansion during charging, thereby being unable to sufficiently suppress the cracking of the particles of alloying material during charging.

However, even the batteries of Comparative Example 2 exhibited sufficiently good cycle characteristics under ordinary charge/discharge cycle conditions (for example, charge/discharge at a 1 hour-rate current). Accordingly, these batteries are expected to have better performance than batteries using conventional alloying materials even when they are required to be charged and discharged rapidly.

Example 5

In this example, the particle size distribution of the alloying material was examined with respect to the case where the transition metal element contained in the B phase was Ti.

A Ti—Si alloying material was produced in the same manner as in Example 1, except that the raw materials were mixed such that the A phase:B phase weight ratio would be 80:20. The particle size distribution of the resultant alloying material was examined, and it was found that the particle size was distributed in a wide range of 0.5 to 200 μm. The mean particle size (D50) was 50 μm. Also, the size of crystal grains (crystallite) of the resultant alloying material was 10 nm.

By classifying this Ti—Si alloying material with a sieve, alloying materials having various particle size distributions as shown in Table 1 were obtained. Negative electrode pellets were produced in the same manner as in Example 1, except for the use of these alloying materials. Using these negative electrodes, batteries were produced, and they were evaluated in the same manner as in Example 1. Table 7 shows the results.

TABLE 6

| | | Ratio of A phase to the total weight of A phase and B phase (% by weight) | | | | | | | | | | |
|---|---|---|---|---|---|---|---|---|---|---|---|---|
| | | 30 | | 40 | | 50 | | 80 | | 95 | | 98 |
| A phase | B phase | Upper left: M content(% by weight), Upper right: Si content(% by weight) Lower left: Discharge capacity(mAh), Lower right: Capacity maintenance rate(%) | | | | | | | | | | |
| Si | CoSi₂ | 35.83 | 64.17 | 31.23 | 68.77 | 25.6 | 74.4 | 10.24 | 89.76 | 2.56 | 97.44 | 1.02 | 98.98 |
| Si | | 5.4 | 90 | 5.7 | 60 | 5.8 | 50 | 6 | 40 | 6.0 | 30 | 6.2 | 20 |
| Si | MnSi₂ | 34.6 | 65.4 | 29.66 | 70.34 | 24.7 | 75.3 | 9.89 | 90.11 | 2.47 | 97.53 | 0.99 | 99.01 |
| Si | | 5.4 | 90 | 5.7 | 60 | 5.8 | 50 | 5.9 | 40 | 6.0 | 30 | 6.2 | 20 |

TABLE 7

| Battery | Classification method | 10% diameter (μm) | Median diameter (μm) | 90% diameter (μm) | Negative electrode porosity (%) | Negative electrode density (g/cm³) | Initial discharge capacity (mAh) | Capacity maintenance rate (%) |
|---|---|---|---|---|---|---|---|---|
| Battery 7-1 | Sieving | 0.05 | 0.10 | 1.0 | 50 | 1.4 | 2.7 | 94 |
| Battery 7-2 | Sieving | 0.10 | 0.50 | 5.0 | 49 | 1.4 | 2.8 | 94 |
| Battery 7-3 | Sieving | 0.30 | 1.0 | 10 | 22 | 2.3 | 5.0 | 94 |
| Battery 7-4 | Sieving | 1.0 | 5.0 | 20 | 20 | 2.3 | 5.0 | 93 |
| Battery 7-5 | Sieving | 2.0 | 10 | 50 | 20 | 2.3 | 5.0 | 92 |
| Battery 7-6 | Sieving | 5.0 | 20 | 80 | 16 | 2.4 | 4.9 | 90 |

TABLE 7-continued

| Battery | Classification method | 10% diameter (μm) | Median diameter (μm) | 90% diameter (μm) | Negative electrode porosity (%) | Negative electrode density (g/cm$^3$) | Initial discharge capacity (mAh) | Capacity maintenance rate (%) |
|---|---|---|---|---|---|---|---|---|
| Battery 7-7 | Sieving | 7.0 | 30 | 100 | 16 | 2.4 | 4.8 | 51 |
| Battery 7-8 | Not classified | 6.0 | 50 | 130 | 16 | 2.4 | 4.8 | 51 |

Table 7 indicates that when the mean particle size (D50) in volume cumulative frequency as a function of particle size distribution is 0.5 to 20 μm, the 10% diameter (D10) 0.1 to 5 μm, and the 90% diameter (D90) 5 to 80 μm, the batteries have high capacities and excellent cycle characteristics (capacity maintenance rate).

With an increase in the mean particle size of the alloying material, the battery capacity increased, but the capacity maintenance rate lowered. This is probably because the increase in the mean particle size of the alloying material makes the distribution of the active material uneven in the negative electrode, so that the expansion and contraction of the negative electrode upon charge and discharge also become uneven, thereby causing deterioration of current collecting property. On the other hand, with a decrease in the mean particle size of the alloying material, the capacity maintenance rate heightened, but the battery capacity lowered. This is probably because the density of the negative electrode mixture lowered.

Example 6

In this example, the kind of the transition metal element contained in the B phase of the alloying material having a preferable particle size distribution was examined. As shown in Table 8, Ti, Zr, Ni, Cu, Fe, Co or Mn was used as the transition metal element.

A Ti—Si alloying material, a Zr—Si alloying material, a Ni—Si alloying material, a Cu—Si alloying material, a Fe—Si alloying material, a Co—Si alloying material, and a Mn—Si alloying material were obtained in the same manner as in Example 1, except that raw materials were mixed such that the A phase:B phase weight ratio would be 80:20. The size of crystal grains (crystallite) of the resultant alloying materials was 10 nm.

These alloying materials were classified with a sieve so as to have particle size distributions as shown in Table 8. The mean particle sizes (D50) of all the alloying materials were unified to 1 μm. Negative electrode pellets were produced in the same manner as in Example 1, except for the use of these alloying materials. Using these negative electrodes, batteries were produced, and they were evaluated in the same manner as in Example 1. Regarding all the alloying materials, the negative electrode porosities were unified to 22%. Table 8 shows the results.

TABLE 8

| Battery | Transition metal | Classification method | 10% diameter (μm) | Median diameter (μm) | 90% diameter (μm) | Negative electrode porosity (%) | Initial discharge capacity (mAh) | Capacity maintenance rate (%) |
|---|---|---|---|---|---|---|---|---|
| Battery 8-1 | Ti | Sieving | 0.30 | 1.0 | 10 | 22 | 5.0 | 94 |
| Battery 8-2 | Zr | Sieving | 0.50 | 1.0 | 12 | 22 | 4.6 | 90 |
| Battery 8-3 | Ni | Sieving | 0.40 | 1.0 | 11 | 22 | 4.5 | 88 |
| Battery 8-4 | Cu | Sieving | 0.60 | 1.0 | 14 | 22 | 4.5 | 79 |
| Battery 8-5 | Fe | Sieving | 0.40 | 1.0 | 11 | 22 | 4.3 | 81 |
| Battery 8-6 | Co | Sieving | 0.30 | 1.0 | 10 | 22 | 4.1 | 63 |
| Battery 8-7 | Mn | Sieving | 0.50 | 1.0 | 12 | 22 | 4.0 | 62 |

As shown in Table 8, all the batteries exhibited good initial discharge capacities. On the other hand, the capacity maintenance rate was low in the batteries using Co and Mn as the transition metal elements. The deterioration of cycle characteristics is due mainly to deterioration of current collecting property caused by charge and discharge. The deterioration of current collecting property occurs when the expansion and contraction of the negative electrode upon charge and discharge changes the electrode structure, thereby increasing the resistance of the whole negative electrode. Such a phenomenon is affected by the kind of the transition metal element that forms the alloying material. It is considered that selecting an appropriate transition metal element makes the strength of the alloying material suited for expansion and contraction upon charge and discharge.

When Ti, Zr, Ni, Cu and Fe were used as the transition metal elements, the capacity maintenance rate was favorable. The use of Ti and Zr was particularly favorable, and the use of Ti was most favorable. This is probably because the sufficient strength of these alloying materials suppressed cracking upon charge. It should be noted that even the use of Co or Mn as the transition metal element has the possibility of providing favorable characteristics if improvements are made in the conductivity of electrode materials or the kind or amount of the conductive agent is changed.

Example 7

In this example, the particle size distribution was controlled by applying wet grinding to the alloying material obtained by mechanical alloying. Ti was used as the transition metal element.

Specifically, the following operations were performed.

First, a Ti—Si alloying material was obtained in the same manner as in Example 1, except that raw materials were mixed such that the A phase:B phase weight ratio would be 80:20. The mean particle size (D50) of the resultant alloying material was 50 μm, and the size of crystal grains (crystallite) was 10 nm.

By grinding this Ti—Si alloying material by means of a wet ball mill, alloying materials having various particle size distributions as shown in Table 9 were obtained. Zirconia balls of φ5 mm were used as the grinding medium. A 500-ml polyethylene container was used as the grinding container. 200 g of each alloying material, 100 zirconia balls and 120 ml of n-butyl acetate were placed in the grinding container. The revolution frequency of the ball mill was made 120 rpm. The grinding time was varied so as to provide desired particle size distributions. Thereafter, the alloying material was collected by removing the n-butyl acetate.

The yields of the alloying materials obtained by wet grinding, together with the alloying materials obtained by sieving in Example 5, are shown in Table 9.

TABLE 9

| Battery | Classification method | 10% diameter (μm) | Median diameter (μm) | 90% diameter (μm) | Yield (%) |
|---|---|---|---|---|---|
| Battery 7-1 | Sieving | 0.05 | 0.10 | 1.0 | 8.1 |
| Battery 7-2 | Sieving | 0.10 | 0.50 | 5.0 | 10.3 |
| Battery 7-3 | Sieving | 0.30 | 1.0 | 10 | 15.7 |
| Battery 7-4 | Sieving | 1.0 | 5.0 | 20 | 23.0 |
| Battery 7-5 | Sieving | 2.0 | 10 | 50 | 35.0 |
| Battery 7-6 | Sieving | 5.0 | 20 | 80 | 61.2 |
| Battery 7-7 | Sieving | 7.0 | 30 | 100 | 60.3 |
| Battery 9-1 | Wet grinding | 0.08 | 0.10 | 0.90 | 90.1 |
| Battery 9-2 | Wet grinding | 0.20 | 0.50 | 4.7 | 90.2 |
| Battery 9-3 | Wet grinding | 0.50 | 1.0 | 8.0 | 90.3 |
| Battery 9-4 | Wet grinding | 2.5 | 5.0 | 18 | 92.2 |
| Battery 9-5 | Wet grinding | 3.0 | 10 | 45 | 92.5 |
| Battery 9-6 | Wet grinding | 7.0 | 20 | 70 | 93.2 |
| Battery 9-7 | Wet grinding | 8.0 | 30 | 88 | 94.1 |

As shown in Table 9, wet grinding resulted in large improvements in alloying material yields in comparison with sieving. It is therefore desirable to grind the alloying material by stirring it with balls, in order to control the particle size distribution of the alloying material.

As used herein, "yield" refers to the percent (%) of the weight of the alloying material collected after the classification (sieving or grinding) relative to the weight of the alloying material supplied to the container before the classification. The closer the yield is to 100, the better the production method is.

According to wet grinding, the difference between D50 and D10 and the difference between D90 and D50 were reduced and the particle size distribution broadening was narrowed, in comparison with sieving. Therefore, wet grinding is suited for producing an alloying material with a narrow particle size distribution broadening.

Thus, the present invention provides a non-aqueous electrolyte secondary battery that is particularly suitable as a main power source and a memory back-up power source of various electronic devices, such as cellular phones and digital cameras. The present invention further provides a non-aqueous electrolyte secondary battery that is preferable for use in applications where the battery is required to have a high electrical capacity and exhibit good cycle characteristics even when the battery is rapidly charged and discharged at a large current.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A non-aqueous electrolyte secondary battery comprising: a positive electrode capable of reversibly absorbing and desorbing Li; a negative electrode; and a non-aqueous electrolyte,
said negative electrode comprising an alloying material that is capable of electrochemically absorbing and desorbing Li,
said alloying material comprising an A phase composed mainly of Si and a B phase comprising an intermetallic compound of at least one transition metal element and Si,
said at least one transition metal element being selected from the group consisting of Ti, Zr, Ni, Cu, and Fe,
at least one of said A phase and said B phase comprising a microcrystalline or amorphous region,
the weight percent of said A phase relative to the total weight of said A phase and said B phase being not less than 50% and not greater than 95%, and
wherein said alloying material has a volume cumulative frequency as a function of particle size distribution in which the mean particle size (median diameter: D50) is 0.5 to 20 μm, the 10% diameter (D10) is 0.1 to 5 μm, and the 90% diameter (D90) is 5 to 80 μm.

2. The non-aqueous electrolyte secondary battery in accordance with claim 1, wherein in said microcrystalline or amorphous region, the crystallite size is not more than 100 nm.

3. The non-aqueous electrolyte secondary battery in accordance with claim 2, wherein in said microcrystalline or amorphous region, the crystallite size is not less than 5 nm and not more than 100 nm.

4. The non-aqueous electrolyte secondary battery in accordance with claim 1, wherein a diffraction spectrum obtained by performing an X-ray diffraction analysis of said alloying material with CuKα rays as a radiation source is such that the most intense diffraction peak in the range of diffraction angle 2θ=10° to 80° has a half width of 0.1° or more.

5. The non-aqueous electrolyte secondary battery in accordance with claim 1, wherein a diffraction spectrum obtained by performing an X-ray diffraction analysis of said alloying material with CuKα rays as a radiation source is such that the most intense diffraction peak in the range of diffraction angle 2θ=20° to 35° has a half width of 0.1° or more.

6. The non-aqueous electrolyte secondary battery in accordance with claim 1, wherein said at least one transition metal element is Ti, and the Si content in said alloying material is 72.4 to 97.7% by weight.

7. The non-aqueous electrolyte secondary battery in accordance with claim 1, wherein said at least one transition metal element is Zr, and the Si content in said alloying material is 62.8 to 96.9% by weight.

8. The non-aqueous electrolyte secondary battery in accordance with claim 1, wherein said at least one transition metal element is Ni, and the Si content in said alloying material is 69.4 to 97.45% by weight.

9. The non-aqueous electrolyte secondary battery in accordance with claim 1, wherein said at least one transition metal element is Cu, and the Si content in said alloying material is 68.2 to 97.35% by weight.

10. The non-aqueous electrolyte secondary battery in accordance with claim 1, wherein said at least one transition metal element is Fe, and the Si content in said alloying material is 70 to 97.5% by weight.

11. The non-aqueous electrolyte secondary battery in accordance with claim 1, wherein said at least one transition metal element is Ti, and said B phase contains $TiSi_2$.

12. The non-aqueous electrolyte secondary battery in accordance with claim 1, further comprising a coin-shaped battery case comprising a positive electrode can and a negative electrode can,
wherein said positive electrode and said negative electrode are in disc form and are placed in said positive electrode can and said negative electrode can, respectively, a separator is interposed between said positive electrode and said negative electrode, and an opening edge of said positive electrode can is fitted to an opening edge of said negative electrode can with an insulating gasket interposed therebetween.

13. The non-aqueous electrolyte secondary battery in accordance with claim 12, wherein said negative electrode has a density of 1.6 to 2.4 $g/cm^3$.

14. The non-aqueous electrolyte secondary battery in accordance with claim 1, wherein the weight percent of said A phase relative to the total weight of said A phase and said B phase is not less than 65% and not greater than 85%.

15. The non-aqueous electrolyte secondary battery in accordance with claim 1, wherein the weight percent of said A phase relative to the total weight of said A phase and said B phase is not less than 70% and not greater than 80%.

* * * * *